United States Patent [19]

Kryszewski

[11] Patent Number: 5,484,054
[45] Date of Patent: Jan. 16, 1996

[54] COMBINATION BOOK CASSETTE

[76] Inventor: Randy K. Kryszewski, 103 E. St. Mary's St., Minooka, Ill. 60447

[21] Appl. No.: 325,875

[22] Filed: Dec. 14, 1994

[51] Int. Cl.⁶ .................................................. B65D 85/575
[52] U.S. Cl. .............. 206/232; 206/307.1; 206/387.13; 281/31
[58] Field of Search ................. 206/232, 307.1, 206/308.1, 308.3, 387.1, 387.13, 459.5; 281/31

[56] References Cited

U.S. PATENT DOCUMENTS

| | | | |
|---|---|---|---|
| 3,352,027 | 11/1967 | Schwartz | 206/232 |
| 3,583,729 | 6/1971 | De Groot | 206/232 |
| 3,641,684 | 2/1975 | Paige | 206/232 |
| 4,002,355 | 1/1977 | Sendor | 206/307.1 |
| 4,255,872 | 2/1981 | Williams, Sr. | 206/232 |
| 5,161,907 | 11/1992 | Byrne | 206/387.13 |

FOREIGN PATENT DOCUMENTS

| | | | |
|---|---|---|---|
| 2239186 | 2/1975 | France | 206/387.13 |
| 2249859 | 5/1992 | United Kingdom | 206/459.5 |

*Primary Examiner*—Jimmy G. Foster
*Attorney, Agent, or Firm*—Banner & Allegretti, Ltd.

[57] ABSTRACT

A combination of an audiotape cassette container secured to a miniature book. The container includes a body, spine and hinged lid. The book includes a folio and includes first and second end sheets. The first end sheet of the book is adhered to the container lid. In addition, a case which includes a front cover, spine cover and back cover is provided for enclosing the container and book. The front cover of the case is adhered to the second end sheet of the book. The spine cover of the case is free of the container spine. The back cover of the case is adhered to the bottom of the container.

7 Claims, 1 Drawing Sheet

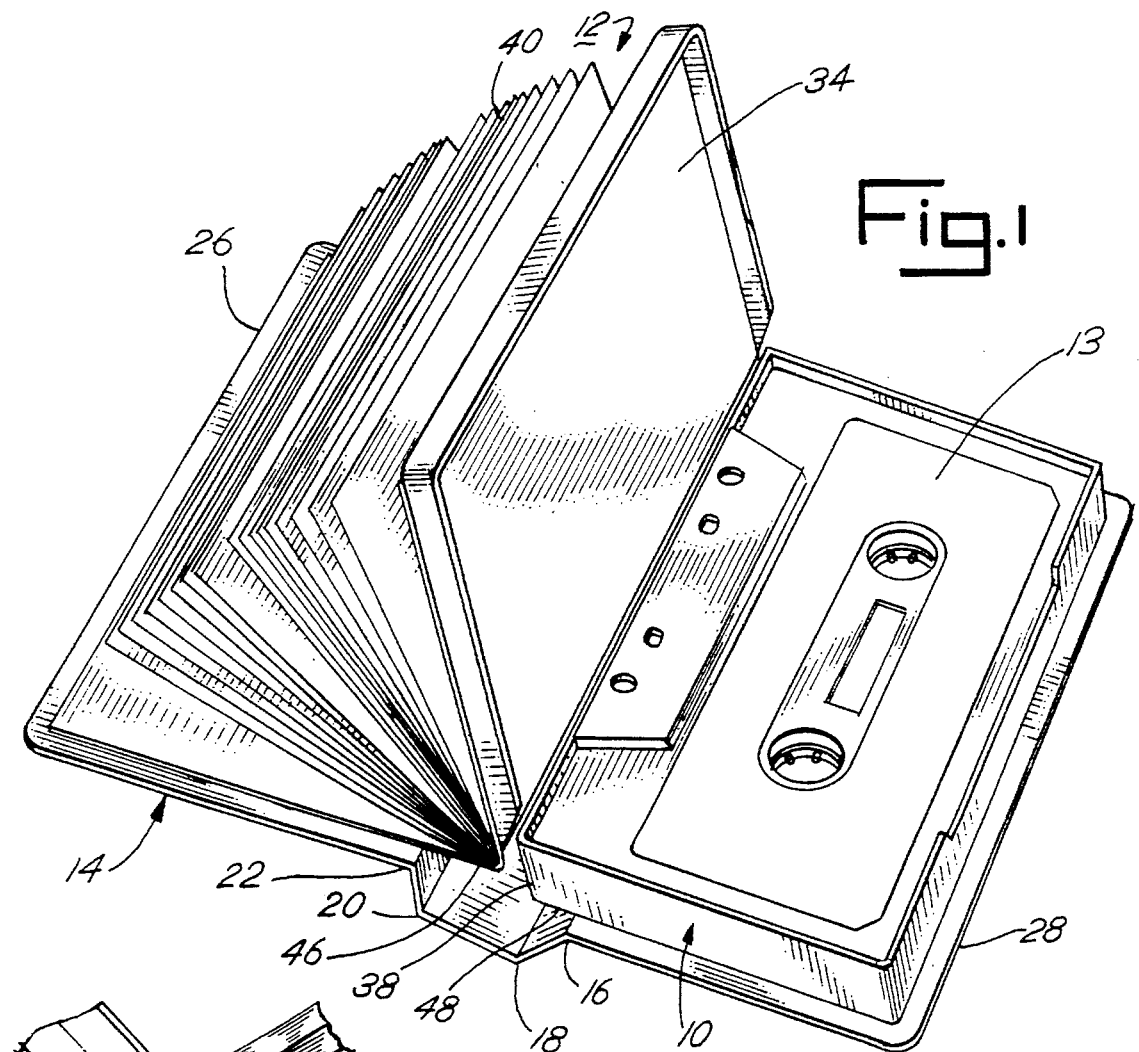
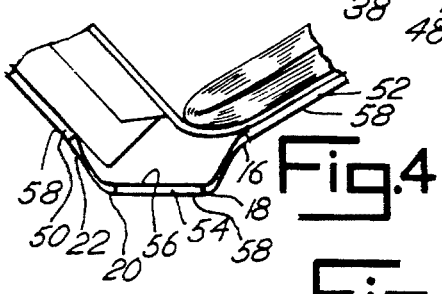
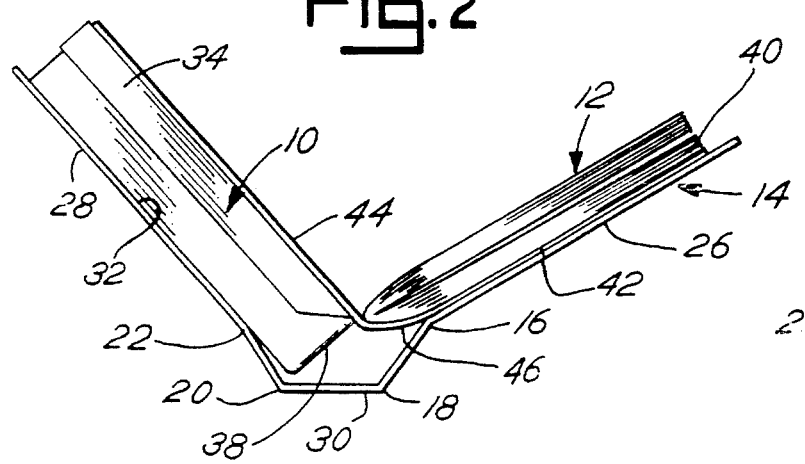
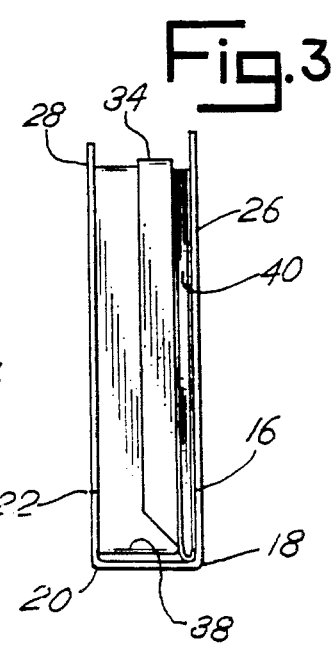

COMBINATION BOOK CASSETTE

This invention relates to a combination book/audio cassette particularly designed for use by children. The combination is slightly larger than a standard audio cassette (2½ inches by 4 inches). The book corresponds to the same dimensions.

It is the object of the invention to provide a book cassette combination of unitary construction which in external appearance looks like a small book; which is rugged in construction to withstand rough usage by children and can be opened to an angle of about 270° without damage to the spine. It is a further object to provide a structure which can be economically manufactured from readily available materials.

These objects are accomplished by adhesively securing the small book to the lid of the cassette container and enclosing the book and cassette container in a case which is hinged along the spine in four places. One cover of the case is secured to the bottom of the cassette container and the other cover is secured to an end sheet of the contained book. The spine area of the case where the hinges are located is not adhered to the container or to the book. Thus, when the case is opened, the spine area along the backbone, including a pair of strips adjacent the backbone, is free to flex outwardly. This permits the covers to be turned back 270° without breakage.

The invention is illustrated in more detail in the example shown in the accompanying drawings in which FIG. 1 is a perspective view of the book/cassette of the invention showing the book in open position.

FIG. 2 is a view looking down on the top of the book/cassette combination which is open.

FIG. 3 is a view similar to FIG. 2 in which the book/cassette combination is in closed position.

FIG. 4 is a fragmentary view similar to FIG. 2 showing an alternative construction in which the case is formed from panels of cardboard sandwiched between sheets of paper.

The combination of the invention comprises a conventional audiotape cassette container 10 and a small book 12 bonded to a case 14. The container is made from molded polypropylene resin or similar plastic material. The case 14 has a front cover 26, a rear cover 28 and a spine cover 30 connecting the front and rear covers. The case has four hinges 16, 18, 20 and 22 extending lengthwise of the covers. When the book is opened, the spine cover 30 moves from the position shown in FIG. 3 to the position shown in FIG. 2.

The cassette container 10 has a rectangular body including a bottom 32 and a cap-type lid 34 hinged at 36 along one sidewall 38 which comprises the spine of the combination. The book of the combination has a folio 40 of multiple pages and end sheets 42, 44. Folio 40 is stapled or adhesively secured to end sheets in the conventional manner. End sheet 42 is adhesively secured to the inside surface of the front cover 26 except for a strip 46 adjacent spine cover 30 which is free of adhesive. End sheet 44 is adhesively secured over its entire area to the top panel of the cassette container lid 44.

The rear cover 28 of the case is adhered to the bottom 32 of the cassette container 10, except for a strip adjacent the spine cover 30 which is free of adhesive. The adhesive-free strips 46, 48 run the length of the spine cover 30.

Pressure sensitive adhesive may be preapplied to the inside surfaces of covers 26, 28 except for the areas opposite strips 46, 48, and covered with a protective film, not shown. During assembly of the combination, the protective film is stripped off and the covers 26, 28 are pressed against the mating surfaces 42 and 32, respectively, to secure the case to the container and the book. Similarly, pressure sensitive adhesive may be applied to the outer surface of lid 34 and protected with a suitable removable film. The film is stripped to expose the adhesive just prior to adhering end sheet 44 to the container lid 34.

The case may be made from heavy paper or preferably from light cardboard covered with paper printed with the title of the book and other content identifying information. In another form of the invention shown in FIG. 4, cardboard panels 50, 52 and spine 54 are sandwiched between paper covers 56, 58. The cardboard panels terminate at hinges 16, 22 and the cardboard spine 54 terminates at hinges 18, 20.

An audio cassette tape 13 may be disposed in the container 10 as shown in FIG. 1. The subject matter of the text of the book and the audio cassette are interrelated so that the child can follow the text as she listens to the cassette removed from the container. The novel hinge construction permits the case to be turned back on itself without any damage. When the combination is closed, the case snuggles in close contact with the sidewall 38 which comprises the spine of the combination. This is shown in FIG. 3.

I claim:

1. The combination of an audiotape cassette container secured to a miniature book said container having a rectangular body including a bottom and side walls, and a lid hinged to said body along one side wall thereof, said one side wall and the lid portion adjacent said hinge comprising the spine of said combination, said book having a folio and first and second end sheets, said first end sheet being adhered to said cassette lid, a case enclosing said container and book combination comprising a front cover, a spine cover and a back cover, said front cover being adhered to said second end sheet except for a strip adjacent said spine, said back cover being adhered to said body bottom except for a strip adjacent said spine, said spine cover being free of said spine, whereby when said lid is in closed position against said body, the non-adhered, free portions of said case lie in contact with the opposed areas of said second end sheet, said spine and said container bottom, respectively, and when said lid is in open position, the free portions of said case are spaced from said opposed areas.

2. The combination of claim 1 in which said case is hinged along lines following opposed edges of said spine and along the lines where the free areas of said case meet the adhered areas on said lid and on said second end sheet.

3. The combination of claim 2 in which said space between said free portions of said case and said opposed areas becomes progressively enlarged as said lid swings away from said body.

4. The combination of claim 2 in which said lid is free to open at an angle of 0° to 270° with respect to said body.

5. The combination of claim 1 in which said case is made from paper.

6. The combination of claim 1 in which said case has hard covers in the areas thereof which are adhered to said lid and said second end sheet.

7. The combination of claim 2 in which said case is made from cardboard panels sandwiched between cover paper sheets, said panels terminating at said hinges so that said paper sheets comprise the hinges.

* * * * *